United States Patent [19]

Miyawaki et al.

[11] Patent Number: 5,115,351
[45] Date of Patent: May 19, 1992

[54] MIRROR SUPPORT APPARATUS AND SYSTEM

[75] Inventors: Keizou Miyawaki; Noboru Itoh; Izumi Mikami, all of Amagasaki, Japan

[73] Assignee: Mitsubishi Denki Kabushiki Kaisha, Hyogo, Japan

[21] Appl. No.: 324,652

[22] Filed: Mar. 17, 1989

[30] Foreign Application Priority Data

| Mar. 18, 1988 | [JP] | Japan | 63-66261 |
| Mar. 18, 1988 | [JP] | Japan | 63-66262 |
| May 16, 1988 | [JP] | Japan | 63-116997 |
| May 16, 1988 | [JP] | Japan | 63-116998 |
| May 16, 1988 | [JP] | Japan | 63-116999 |
| May 16, 1988 | [JP] | Japan | 63-117000 |
| May 19, 1988 | [JP] | Japan | 63-124213 |

[51] Int. Cl.⁵ .................. G02B 5/08; G02B 26/08
[52] U.S. Cl. .................. 359/849; 359/224
[58] Field of Search .............. 350/537, 538, 631, 635, 350/637–641, 321, 143, 600, 320, 321, 800, 606–617, 486, 487; 188/268, 378

[56] References Cited

U.S. PATENT DOCUMENTS

| 3,603,671 | 9/1971 | Brown | 350/611 |
| 4,500,170 | 2/1985 | Montesanto | 350/611 |
| 4,601,553 | 7/1986 | Pepi et al. | 350/611 |
| 4,601,554 | 7/1986 | Plante et al. | 350/611 |
| 4,632,523 | 12/1986 | Knohl | 350/611 |
| 4,775,230 | 10/1988 | Meier | 350/611 |
| 4,875,764 | 10/1989 | Marino et al. | 350/611 |

FOREIGN PATENT DOCUMENTS

| 3444265 | 6/1986 | Fed. Rep. of Germany . |
| 3521973 | 7/1986 | Fed. Rep. of Germany . |
| 379422 | 8/1980 | U.S.S.R. | 350/609 |
| 223104 | 10/1982 | U.S.S.R. | 350/609 |

OTHER PUBLICATIONS

"Design Features of the Space Telescope", Brown E. B.
International Conference on Advanced Technology Optical Telescopes, SPIE vol. 332, Section 2, New Telescope Projects, 1982.
Very Large Telescope Interim Report, presented by ESO Study Group, Jan. 1986.
Conceptual Design of University of Texas 300-Inch Telescope, WDL-TR9039, Jan. 1981.

Primary Examiner—Bruce Y. Arnold
Assistant Examiner—Thong Nguyen

[57] ABSTRACT

A mirror support apparatus for a reflecting telescope employs an astatic lever with a counterweight to provide radial support and drives the lever parallel to the telescope axis to provide axial support. The axial supporting force is delivered to the mirror through a load cell which is located between the end of the lever and the mirror directly or indirectly (through a linking rod or diaphragms). The load cell therefore detects the entire axial force applied, and does not detect radial components even if the mirror shifts in relation to its cell. The lever is driven in the axial directing through a spring which helps achieve fine adjustment. A damping device can be added to damp vibrations. The counterweight can be attached to the lever by another spring to compensate for lever bending effects. This apparatus is capable of providing both axial and radial supporting forces with the high precision required by very large, thin telescope mirrors. A mirror support system for a reflecting telescope supports the mirror at multiple points by apparatus as described above, and by fixed supports at one or more additional points. Feedback from load cells in the apparatus and at the fixed support points enables the axial support to be optimized for the telescope attitude and for external factors such as wind loads.

20 Claims, 11 Drawing Sheets

F I G. 16 A  F I G. 16 B  F I G. 16 C
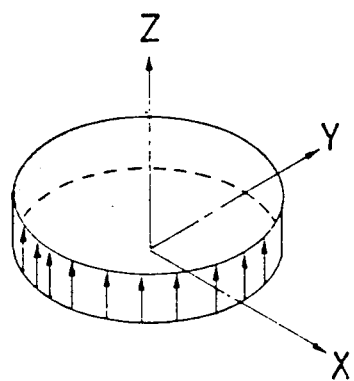 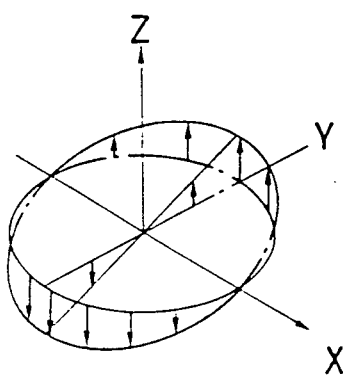 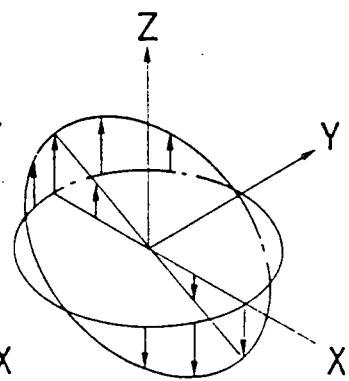
F I G. 17
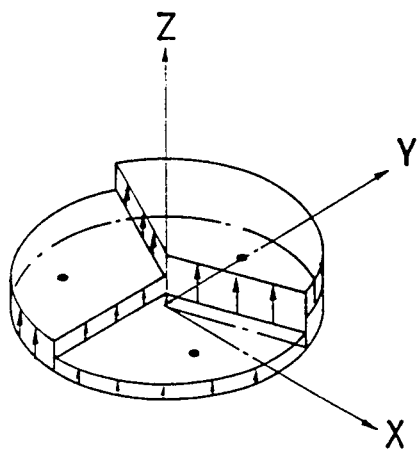

5,115,351

MIRROR SUPPORT APPARATUS AND SYSTEM

BACKGROUND OF THE INVENTION

This invention relates to a support apparatus for the primary mirror of a reflecting telescope, and to a mirror support system.

Large optical reflecting telescopes are essential tools of astronomical research. For useful observations, the primary mirror of a reflecting telescope must maintain a surface figure accurate to within 1/6 the wavelength of light, or approximately 100 nanometers, despite the action of forces tending to distort the mirror's shape. The main distorting force is the mirror's own weight, which causes the mirror to sag to varying degree and in varying directions depending on the telescope's attitude.

The traditional means of mirror support is the astatic lever, which has been widely employed since its invention by Lassel in 1841. This is a passive supporting means that uses a counterweighted lever to provide a supporting force that balances the weight of the mirror correctly regardless of the telescope attitude. Since it is relevant to the present invention, the theory of the astatic lever will be briefly described below.

FIG. 1 shows the astatic lever concept. The mirror 1 is linked to a lever 2 in such a way that the lever 2 supports the mirror 1 in the axial direction, parallel to the optic axis $Z_{OA}$ of the telescope. A counterweight 3 is affixed to the end of the lever 2 distant from the mirror. Let $W_1$ be the weight of the mirror 1, let $W_A$ be the vector component of this weight in the axial direction, and let $\theta$ be the attitude of the telescope axis with respect to the horizon. Then:

$$W_A = W_1 \sin\theta$$

Similarly, let $W_2$ be the weight of the counterweight 3, let $l_1$ be the length of the lever 2 from its pivot point to the end near the mirror 1, let $l_2$ be the length from the pivot point to the counterweight 3, and let $F_A$ be the supporting force provided by the lever 2 in the axial direction. Like $W_A$, the quantity $F_A$ obeys a sine law:

$$F_A = (W_2 \sin\theta) \times (l_2/l_1)$$

The condition for equality of $W_A$ and $F_A$ is:

$$W_1 = W_2(l_2/l_1)$$

Thus if the length $l_2$ from the pivot point to the counterweight 3 is properly adjusted, the lever 2 will provide a supporting force that exactly compensates for the mirror's weight, regardless of the telescope attitude.

FIG. 2 shows a similar astatic lever mounted to provide radial support. Let $W_R$ be the vector component of the weight of the mirror 1 in the radial direction, $F_R$ be the supporting force provided by the lever 2 in the radial direction, $W_3$ be the weight of the counterweight 3, and $l_3$ and $l_4$ be the lengths of the lever 2 from its pivot point to its end near the mirror 1 and to the counterweight 3, respectively. In this case $W_R$ and $F_R$ both obey a cosine law:

$$W_R = W_1 \cos\theta$$

$$F_R = (W_3 \cos\theta) \times (l_4/l_3)$$

The condition for equality of $W_R$ and $F_R$ is:

$$W_1 = W_3(l_4/l_3)$$

If the length $l_4$ is properly adjusted, once again the correct supporting force will be applied regardless of the telescope attitude.

The primary mirror of a reflecting telescope is mounted in a structure called a mirror cell, which must support the mirror in both the axial and radial directions. In a large telescope, the primary mirror is generally "floated" on a plurality of astatic levers that provide radial support at the mirror periphery and axial support at interior points, as illustrated in FIG. 3. The mirror cell 4 in FIG. 3 also has fixed supports 5 which support the mirror rigidly at, for example, three points (only two of which are shown in the drawing). Support apparatus of the type illustrated in FIG. 3 was used in almost all large reflecting telescopes built before 1970.

Although simple and elegant, the astatic lever alone is inadequate for the largest telescopes being designed at present, which will have primary mirros with diameters on the order of 8 meters. To reduce the cost of the mirror blank and the time require for annealing, such mirrors will have a meniscus shape with a high aspect ratio; i.e. they will be extremely thin in relation to their diameter. This aggravates the problem of mirror sag.

The maximum allowable thickness for a mirror 8 meters in diameter is considered to be about 20 centimeters. To maintain an accurate surface figure, a mirror of these dimensions must receive support in both the axial and radial directions at a large number of points. In particular, it must recieve radial support at interior points as well as around its periphery. If such a mirror is supported at, say, 400 points, then the required supporting force at each point is approximately 50 kilograms in the combined radial and axial directions. The maximum allowable error is ±15 grams in the axial direction and ±300 grams in the radial direction.

Astatic levers are not capable of providing supporting force with this degree of precision, particularly in the axial direction. One problem is that an astatic lever tends to sag itself, as indicated by the dashed lines in FIGS. 1 and 2, thus the counterweight moves and the components of the vector $W_2$ or $W_3$ change. An astatic lever providing a force of 50 kilograms is accurate at best to within ±200 grams. Another problem is that astatic levers do not compensate for non-weight effects such as inertia and wind loading.

Accordingly, the designs of some recent telescopes, such as the 3.58-meter New Technology Telescope at the European Southern Observatory in Chile and the proposed 300-inch telescope being studied by the University of Texas, employ motor-driven actuators rather than astatic levers, particularly for support in the axial direction. The motors that drive the actuators are controlled by a computer. The computer is provided with data indicating, for each telescope attitude, the exact axial supporting force required at each point. Each supporting actuator is equipped with a sensor such as a load cell for measuring the force actually applied. If the applied force deviates from the required force, the computer controls the motor so as to correct the force.

The actuators used in the aforementioned New Technology Telescope in Chile provide support only in the axial direction. They are not suitable for offering radial support, which in this telescope is provided by astatic levers at the perimeter of the mirror. This arrangement is adequate due to the comparatively small diameter of the mirror.

The actuators considered in the design of the aforementioned 300-inch telescope comprise an astatic lever for radial support, a motor-driven mechanism for axial support, and a load cell for sensing the force applied in the axial direction. The load cell is located at an intermediate point in the actuator, behind the motor. A problem with this design is that the load cell is unable to sense the correct force applied to the mirror, because part of the mirror's weight load is carried through the actuator mounting to the mirror cell and it is not carried to the load cell. It is difficult to correct for this effect because the proportion of the load diverted in this way varies complicatedly depending on the telescope attitude and circumstance temperature. A further problem is that if the mirror shifts relative to the mirror cell, the counterweight of the astatic lever begins to exert supporting force in the axial direction as well as the radial direction, but the load cell cannot detect this axial component, causing the controlling computer to misjudge the axial force applied. Yet a further problem is that the astatic lever that provides radial support is subject to sag as mentioned previously. Still another problem is that the motor drives the axial supporting mechanism directly, requiring extremely fine degrees of motor control.

Thus neither of the above systems of mirror support are satisfactory for an extremely large, thin mirror requiring highly accurate support in both the radial and axial directions at a plurality of points.

SUMMARY OF THE INVENTION

It is accordingly an object of the present invention to provide a mirror support apparatus capable of accurately detecting the force applied in the axial direction, and applying accurate supporting forces in both the axial and radial directions.

Another object of the present invention is to provie a mirror support system employing the above mirror support apparatus and at least one fixed support, and having a control system capable of correcting the applied axial force in response to external factors such as wind loads.

A mirror support apparatus according to the present invention comprises a lever oriented in a direction substantially parallel to the axis of the telescope, a counterweight fastened to one end of the lever, a sliding mechanism slidably mounted in the mirror cell, a gimbal mounted in the sliding mechanism and attached to an intermediate point of the lever, for enabling the lever to pivot at different angles with respect to the sliding mechanism, a load cell rigidly attached to the mirror, a coupling means for coupling the other end of said lever to said mirror and said load cell so that said lever can exert an axial force on said load cell and a radial force on said mirror, a drive mechanism mounted in said mirror cell, for moving said first sliding mechanism in a direction substantially parallel to the axis of said telescope, and a control means for controlling said drive mechanism according to the force detected by said load cell.

A mirror support system according to this invention comprises a mirror cell with mirror support apparatus according to this invention for providing axial and radial support to the mirror at multiple points, at least one fixed support for providing rigid axial support to the mirror, at least one fixed load cell for sensing the rigid axial support, a group controller for receiving a signal indicating the attitude of the reflecting telescope and therefrom generating commands indicating an optimum axial force to be applied by respective controllers, a feedback device for receiving a load signal from the fixed load cell, calculating an additional axial force to be provided by the actuators and adding information indicating the additional axial force to the commands generated by the group controller, and a plurality of controllers for receiving signals from the load cells in the mirror support apparatus, receiving the commands from the group controller, and controlling respective actuators so as to bring the axial support provided to the mirror into equality with the optimum axial force.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIGS. 16A to 16C are schematic diagrams illustrating a possible control scheme for use in the mirror support system in FIG. 15;

FIG. 17 is a schematic diagram illustrating another possible control scheme for use in the mirror support system in FIG. 15.

DETAILED DESCRIPTION OF THE PREFERRED EMBODIMENTS

Figure 1:
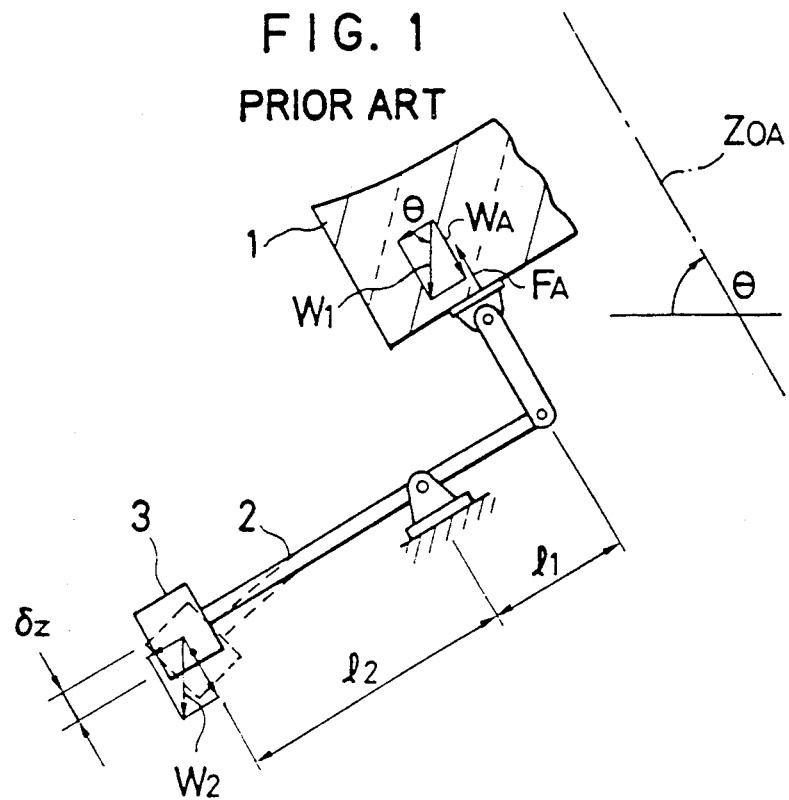
FIG. 1 is a schematic drawing of an astatic lever for providing axial support.

A novel mirror support apparatus embodying this invention will be described with reference to FIG. 4. The apparatus is an actuator which is mounted in a mirror cell 4 and provides support to a mirror 1. Only part of the mirror 1 and the mirror cell 4 are shown in the drawing. The mirror support apparatus comprises a lever 2 oriented substantially parallel to the axis of the telescope and having a counterweight 3 at one end, a first gimbal 6 rotationally attached to the lever 2 at a pivot point located near the mirro cell 4, a first sliding mechanism 7 rotationally attached to the first gimbal 6 and guided to move linearly within the mirror cell 4, a spring 8 coupled to the first sliding mechanism 7, a drive mechanism 9 mounted in the mirror cell 4 and coupled to the spring 8, a load cell 10 mounted in a hole in the back surface of the mirror 1, and a coupling means 11 attached at the other end of the lever 2, enabling the lever 2 to exert a radial force on the mirror 1 and an axial force on the load cell 10. The coupling means 11 in this actuator comprises a second gimbal 12 rotationally attached to the lever 2 and a second sliding mechanism 13, rotationally attached to the second gimbal 12, which is guided so that it can move longitudinally and substantially without friction within the hole. The gimbals 6 and 12 are well-known structures that permit the lever 2 to pivot at arbitrary angles with respect to the first sliding mechanism 7 and the second sliding mechanism 13. The drive mechanism 9 can comprise, for example, a stepping motor and a high-precision threaded screw turned by the stepping motor.

The radial supporting force supplied by this mirror support apparatus is generated by the weight of the counterweight 3, is amplified by the lever 2 which pivots at the first gimbal 6, and is transmitted through the second gimbal 12 and the second sliding mechanism 13 to the mirror 1. The radial supporting force is maintained at substantially the optimum level by the astatic lever principle in the same way as in the prior art, as explained in FIG. 1.

The axial supporting force supplied by the mirror support apparatus is generated by the drive mechanism 9 and transmitted through the spring 8, the first sliding mechanism 7, the first gimbal 6, the lever 2, and the second gimbal 12 to the second sliding mechanism 13. Friction between the second sliding mechanism 13 and the mirror 1 is small enough that very little of the force is transmitted directly from the second sliding mechanism 13 to the mirror 1; substantially all of the force is transmitted to the mirror 1 through the load cell 10. The load cell 10 therefore detects substantially all of the force applied to the mirror 1 in the axial direction.

The axial supporting force is optimized as follows. The optimum axial supporting force depends on the telescope attitude. A controlling system such as a computer system not shown in the drawing monitors the telescope attitude and the force indicated by the load cell 10 and, if the force detected by the load cell 10 differs from the optimum force, causes the drive mechanism 9 to compensate by moving forward to increase the force or backward to reduce the force. This compensating action is continued until the load cell 10 detects that the optimum force is applied.

Even if the relative positions of the mirror 1 and mirror cell 4 shift, because of the location of the load cell 10 the force detected is always parallel to the mirror axis. The load cell 10 never detects radial force components, as in prior-art designs in which the load cell 10 is disposed distantly from the mirror. The controlling system can thus adjust the actual applied axial force to the correct optimum value regardless of the positional relationship of the mirror 1 and mirror cell 4.

The purpose of the spring 8 is to absorb a proportion of the motion of the drive mechanism 9, so that a given motion of the drive mechanicm 9 produces a proportionally smaller change in the axial force applied to the mirror 1. The advantage of this arrangement is that it enables finer adjustment of the axial supporting force than in prior-art designs employing a direct coupling without a spring.

Although placing the load cell 10 in contact with the mirror inside a hole in the back of the mirror ensures accurate detection of the force applied to the mirror, it also requires a fairly deep hole. For extremely thin mirrors, such a deep hole may not be feasible. Accordingly a second novel mirror support apparatus, in which the load cell 10 is not located inside the hole, will be described with reference to FIGS. 5 and 6.

Figure 4:
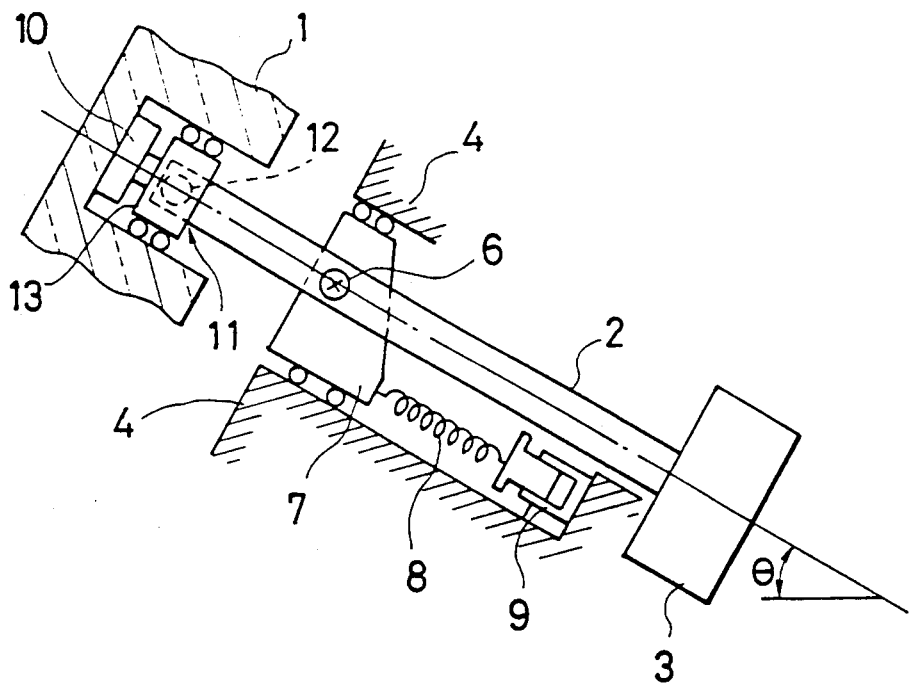
FIG. 4 is a schematic diagram of a novel mirror support apparatus.
Figure 5:
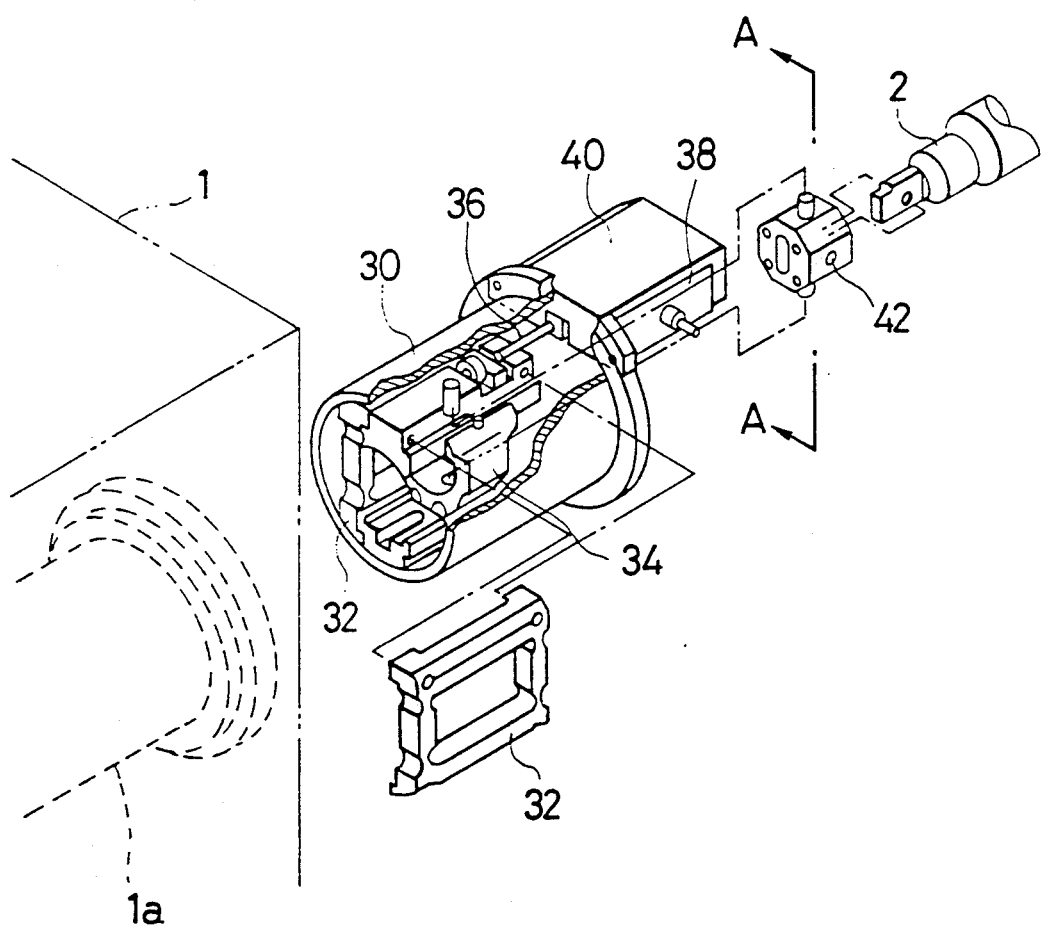
FIG. 5 is an oblique view of another novel mirror support apparatus.
Figure 6:
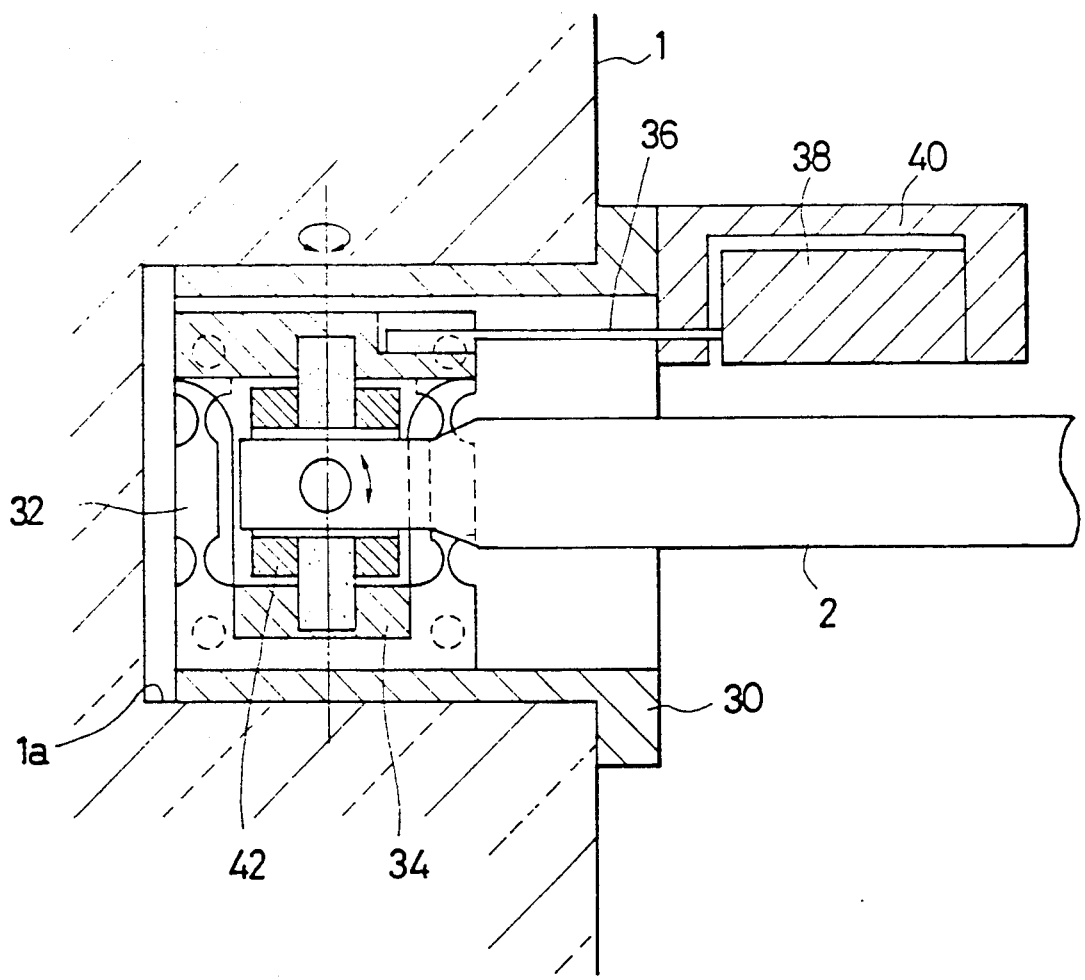
FIG. 6 is a sectional view of the apparatus in FIG. 5.

The second novel mirror support apparatus is identical to the first novel mirror support apparatus regarding the lever 2, the counterweight 3, the first gimbal 6, the first sliding mechanism 7, the spring 8, and the drive mechanism 9 in FIG. 4. It differs in the coupling means and the disposition of the load cell. FIG. 5 shows an oblique view of the coupling means of the second novel actuator, including the load cell and other associated parts; FIG. 6 shows a sectional view taken along line A—A in FIG. 5.

The coupling means in this mirror support apparatus comprises a sleeve 30 which is tightly embedded in a hole 1a in the mirror 1. The sleeve 30 has an interior projecting part, visible at the bottom front in FIG. 5, for the attachment of a suspending means comprising a pair of flexible links 32, one on the right and one on the left. These flexible links 32 possess a high degree of rigidity in the vertical direction in FIGS. 5 and 6, but very little rigidity and a high degree of elasticity in the horizontal direction. The pair of flexible links 32 are also attached to a bearing 34, which is thus substantially decoupled from the sleeve 30 in the axial direction but rigidly coupled to it via the flexible links 32 in the radial direction. The bearing 34 is mechanically coupled by a linking rod 36 to a load cell 38 which is mounted in a load cell mount 40 attached to the rim of the sleeve 30 outside the mirror 1. A ring 42 is rotationally coupled to the bearing 34, and the lever 2 is rotationally coupled to the ring 42. The bearing 34 and ring 42 form a gimbal structure similar in function to the second gimbal 12 in FIG. 4.

This mirror support apparatus operates as follows. As in the first mirror support apparatus, the lever 2 applies both axial and radial supporting forces. The axial supporting force is generated by the drive mechanism 9; the radial force by the counterweight 3. The radial supporting force is transmitted from the lever 2 through the ring 42, the bearing 34, the flexible links 32, and the sleeve 30 to the mirror 1. A very large fraction x of the axial supporting force, 98% for example, is transmitted from the lever 2 through the ring 42, the bearing 34, the linking rod 36, the load cell 38, the load cell mount 40, and the sleeve 30 to the mirror 1. The load cell 38 detects the magnitude of this component of the supporting force. A small remaining fraction of the axial supporting force, 2% for example, is transmitted from the bearing 34 via the flexible links 32 to the sleeve 30, hence directly to the mirror 1 without being detected by the load cell 38.

To determine the total axial force applied to the mirror 1, the control system (not shown in the drawing) multiplies the force detected by the load cell 38 by a constant equal to the reciprocal of x. If this force does not have the desired magnitude, the control system causes the drive mechanism 9 (shown in FIG. 4) to move forward or backward to correct the axial support force to the optimum value.

One advantage of the second novel mirror support apparatus is that since the load cell 38 and its mount 40 are not located inside the hole in the mirror 1 but are mounted on the rim of the sleeve 30 behind the mirror surface, the hole need not be as deep as in the first embodiment. Another advantage is that the flexible links 32 guide the bearing 34 so that it moves smoothly, stably, and linearly without friction, and the small proportion of the axial force transmitted through the flexible links 32 to the sleeve 30, thus not detected by the load cell 38, is substantially constant, being independent of the telescope attitude and the positional relationship between the mirror 1 and the mirror cell 4. Multiplication of the load detected by the load cell 38 by a constant coefficient therefore gives the actual value of the applied axial force with high accuracy.

Figure 7:
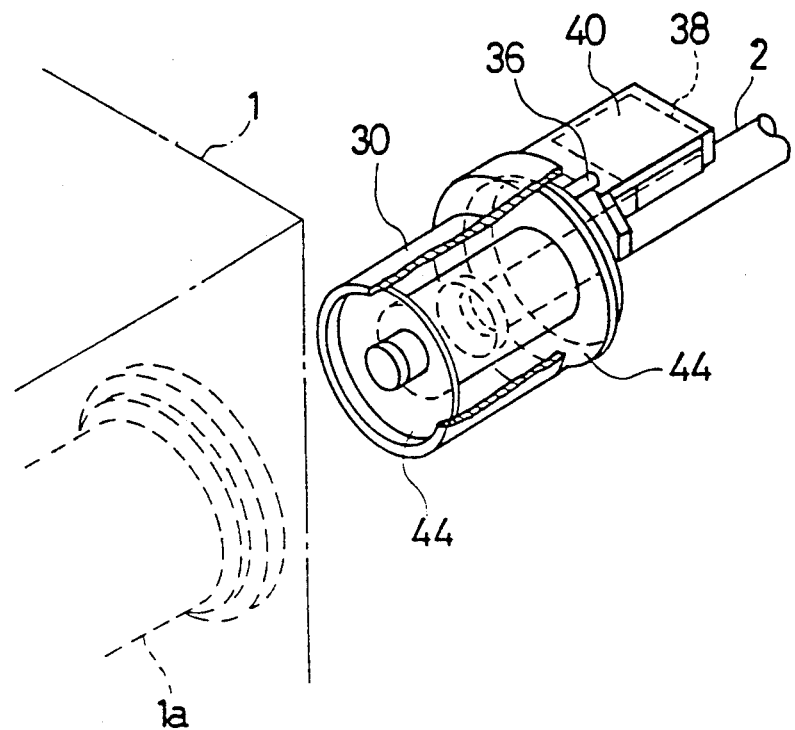
FIG. 7 is an oblique view of still another novel mirror support apparatus.
Figure 8:
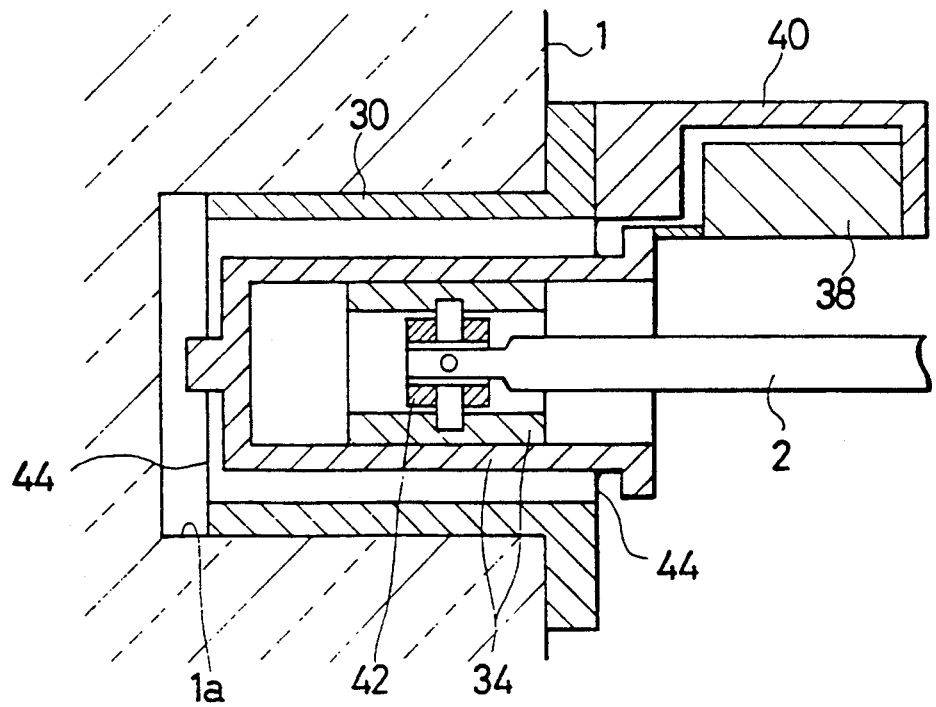
FIG. 8 is a sectional view of the apparatus in FIG. 7.

The flexible links 32 in FIGS. 5 and 6 can be replaced by other suspending means providing the same function of substantially decoupling the lever 2 from the sleeve 30 in the axial direction while maintaining a rigid coupling in the radial direction. For example, they can be replaced by a pair of thin diaphragms 44 made of a material such as metal, as illustrated in FIGS. 7 and 8. The diaphragms 44 are coupled to the bearing 34 at points in front of and behind the location of the ring 42. Like the flexible links 32 in FIGS. 5 and 6, the diaphragms 44 transmit all of the applied radial supporting force directly to the sleeve 30, but transmit only a very small and constant proportion of the applied axial supporting force to the sleeve 30. Further description of the operation of the mirror support apparatus in FIGS. 7 and 8 will be omitted, since it is the same as in FIGS. 5 and 6.

Next, other novel mirror support apparatus, similar to the ones already shown, will be described with reference to FIGS. 9 and 10. The apparatus in FIGS. 9 and 10 addresses the problem of vibration in the axial direction caused by external forces such as wind loads or the inertia of the mirror's mass.

Figure 9:
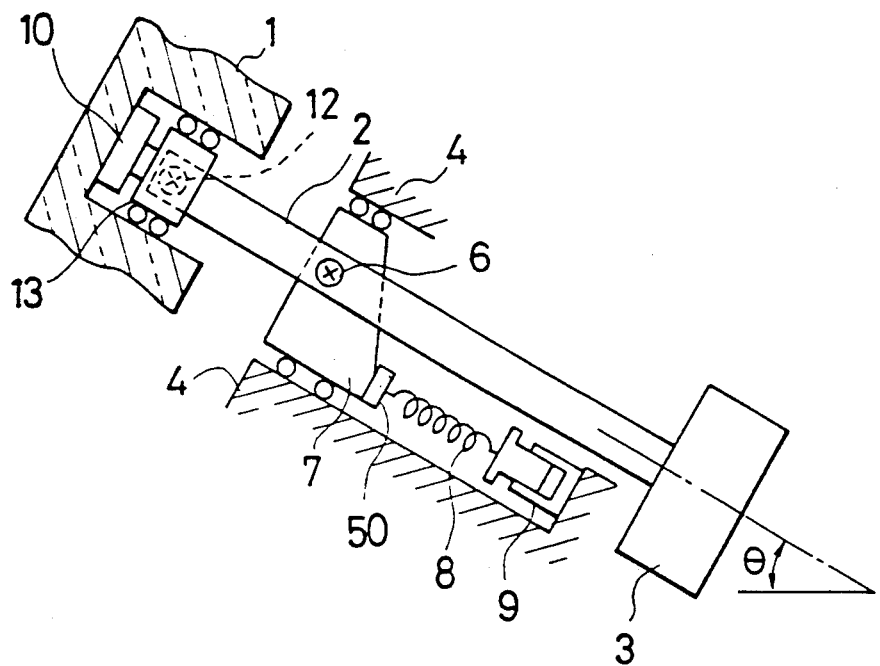
FIG. 9 is a schematic view of a novel mirror support apparatus equipped with a damping device.

The novel mirror support apparatus shown in FIG. 9 is identical to the one shown in FIG. 4 except for the insertion of a damping device 50 between the first sliding mechanism 7 and the spring 8. The damping device 50 can be, for example, a pad made of a material such as rubber. The effect of the damping device 50 is explained next.

Wind striking the reflecting surface of the mirror 1 causes the mirror 1 to vibrate slightly at its natural frequency of vibration of, for example, 20 Hz. This vibration is transmitted via the load cell 10, the second sliding mechanism 13, the second gimbal 12, the lever 2, the first gimbal 6, the first sliding mechanism 7, the damping device 50, the spring 8, and the drive mechanism 9 to the mirror cell 4. Even if the mirror cell 4 is held stable, the spring 8 allows the mirror 1 to vibrate. The vibration is, however, rapidly damped by the damping device 50, and accordingly does not degrade the performance of the telescope.

Figure 10:
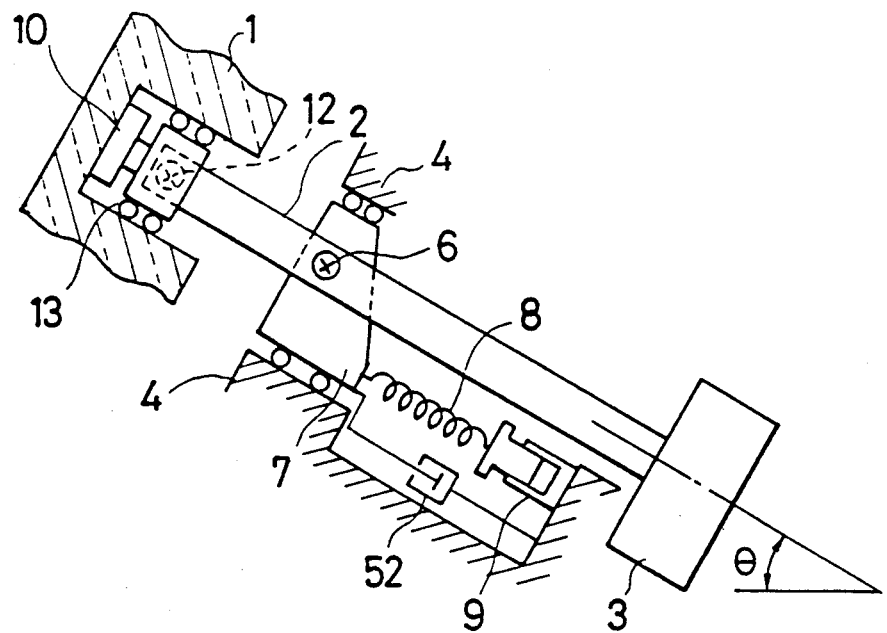
FIG. 10 is a schematic view of another novel mirror support apparatus equipped with a damping device.

In the mirror support apparatus shown in FIG. 10, a damping device 52 is mounted in parallel with the spring 8 instead of directly between the spring 8 and the first sliding mechanism 7. The damping device 52 in FIG. 10 can be a well-known device such as a pneumatic or hydraulic damper. If wind causes the mirror 1 to vibrate at its natural frequency in the axial direction, the vibration is transmitted to the load cell 10, the second sliding mechanism 13, the second gimbal 12, the lever 2, the first gimbal 6, and the first sliding mechanism 7. At this point, part of the vibration is transmitted through the spring 8 and the drive mechanism 9 to the mirror cell 4, while the remaining part is transmitted via the damping device 52 to the mirror cell 4. The damping device 52 damps the vibration in the same way as the damping device 50 in FIG. 9. Even though it receives only part of the vibration, the damping device 52 still damps the vibration rapidly enough to prevent degradation of the telescope's performance.

The damping devices illustrated in FIGS. 9 and 10 can also be applied to the novel mirror support apparatus shown in FIGS. 5 to 8.

The novel mirror support apparatus described thus far has included provisions for highly precise axial support, but has left radial support to the operation of the astatic lever principle. As noted previously, bending of the lever under the load of the counterweight introduces inaccuracy into the supporting force provided by an astatic lever. The inaccuracy is not necessarily so large as to impair the operation of the foregoing apparatus, because a greater tolerance is allowable in the radial direction than in the axial direction, but the inaccuracy can be substantially eliminated by a novel means described next.

For clarity, this novel means will first be described in relation to the simple astatic levers that were shown in FIGS. 1 and 2; then its application to the novel mirror support apparatus will be illustrated. The novel means is first shown in FIG. 11 for an astatic lever like that in FIG. 1.

The novel means comprises a coil spring 60 fastened at one end to the lever 2 and at the other to the counterweight 3, and a slide bearing 62 permitting the counterweight 3 to move substantially without resistance along the lever 2. The counterweight 3 thus moves under the influence of its own weight to a point on the lever 2 where its weight is balanced by the force of the coil spring 60. The manner in which the slide bearing and coil spring 60 eliminate the inaccuracy in the supporting force generated by the counterweight 3 is explained next.

When the counterweight 3 slides under its own weight, the axial support force increases by an amount $F_C$ given by the formula:

$$F_C = W_2(\delta_y/l_1) \sin \theta$$

where $\delta_y$ is the displacement of the counterweight 3 along the lever 2. The bending deflection of the lever 2 is maximal when the telescope is pointed toward the horizon and the angle of inclination $\theta$ is 0°. If the displacement of the counterweight 3 at this angle is $\delta_{y0}$, then the displacement $\delta_y$ at an arbitrary angle $\theta$ is given by the formula:

$$\delta_y = \delta_{y0} \cos \theta \tag{9}$$

The change in the supporting force is accordingly:

$$F_C = W_2 \frac{\delta_{y0} \cos\theta}{l_1} \sin\theta \quad (10)$$

$$= W_2 \frac{\delta_{y0}}{2l_1} \sin 2\theta$$

The error in the supporting force can be calculated from the formula:

$$F_C' = -W_2 \frac{\delta_{z0}}{2l_1} \sin 2\theta + W_2 \frac{\delta_{y0}}{2l_1} \sin 2\theta \quad (11)$$

$$= W_2 \frac{\sin 2\theta}{2l_1} (\delta_{y0} - \delta_{z0})$$

This formula implies that if the spring constant of the coil spring 60 is selected so that $\delta_{y0} = \delta_{z0}$, the error in the supporting force can be reduced to substantially zero.

Figure 11:
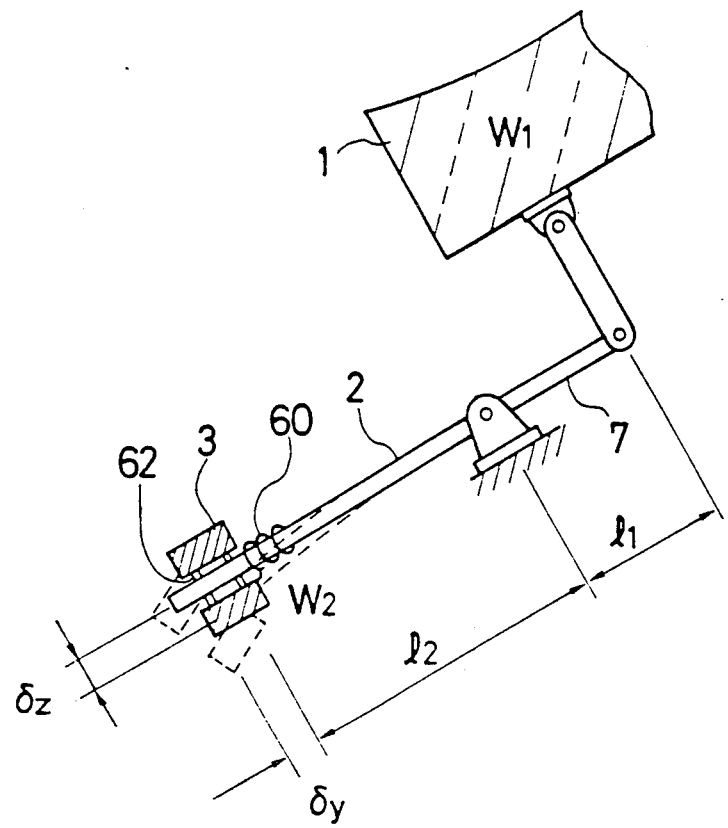
FIG. 11 is a schematic view of a novel astatic lever having a spring-mounted counterweight for axial support.
Figure 12:
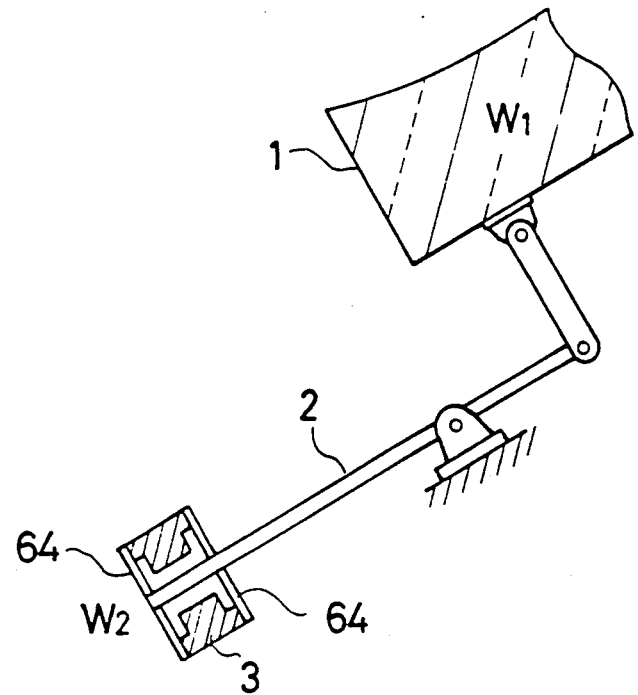
FIG. 12 is a schematic view of another novel astatic lever having a spring-mounted counterweight for axial support.

Instead of a coil spring 60 and slide bearing 62 as shown in FIG. 11, leaf springs 64 can be used as illustrated in FIG. 12. The leaf springs 64 in FIG. 12 are fastened to the lever 2 at one end and to the counterweight 3 at the other end, and by flexing permit the counterweight 3 to move in the same way as in FIG. 11, with the same effect. Thus if the leaf springs 64 have an appropriate spring constant, their flexing will compensate for the sag of the lever 2, substantially eliminating inaccuracy of the supporting force.

Figure 2:
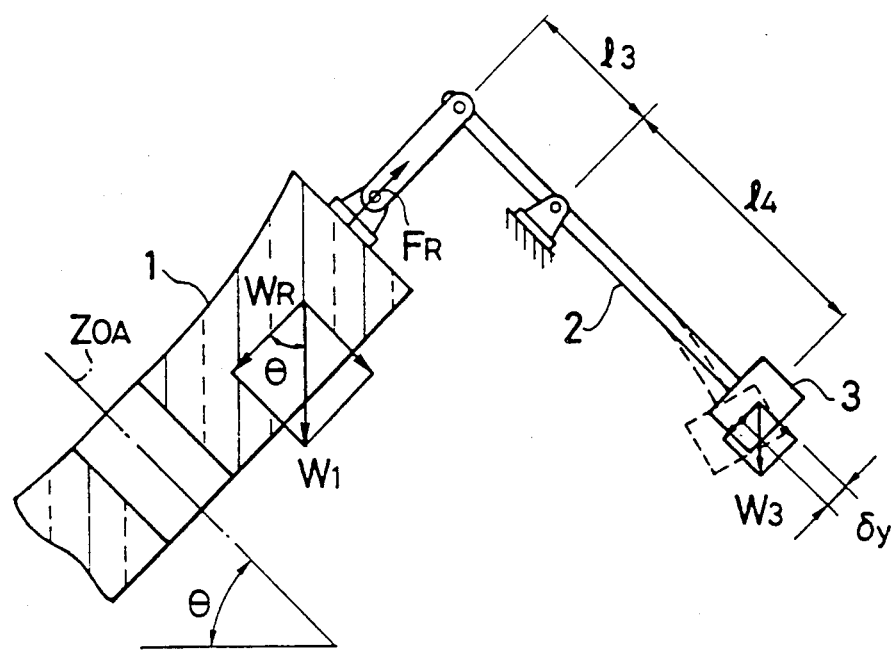
FIG. 2 is a schematic drawing of an astatic lever for providing radial support.
Figure 3:
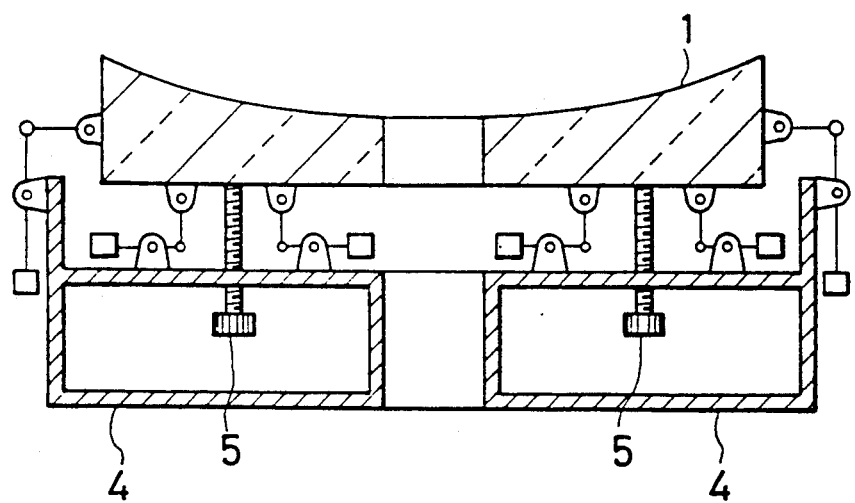
FIG. 3 is a schematic drawing of a prior-art primary mirror support system.
Figure 13:
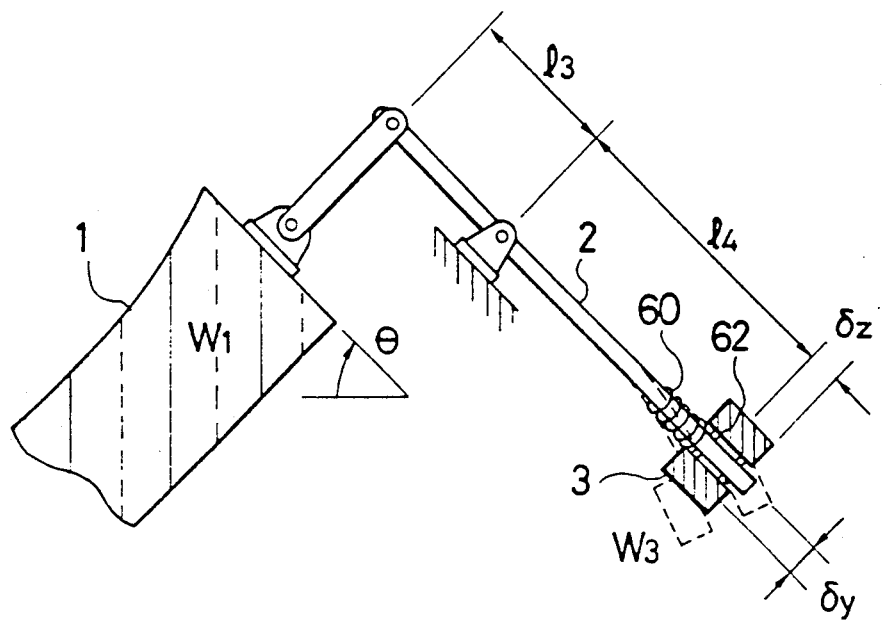
FIG. 13 is a schematic view of a novel astatic lever having a spring-mounted counterweight for radial support.

A coil spring 60 and slide bearing 62 can similarly be added to the astatic lever 2 in FIG. 2 to give the configuration shown in FIG. 13. A mathematical argument analogous to the preceding one shows that with appropriate selection of the spring constant, the inaccuracy in the supporting force can again be substantially eliminated.

Figure 14:
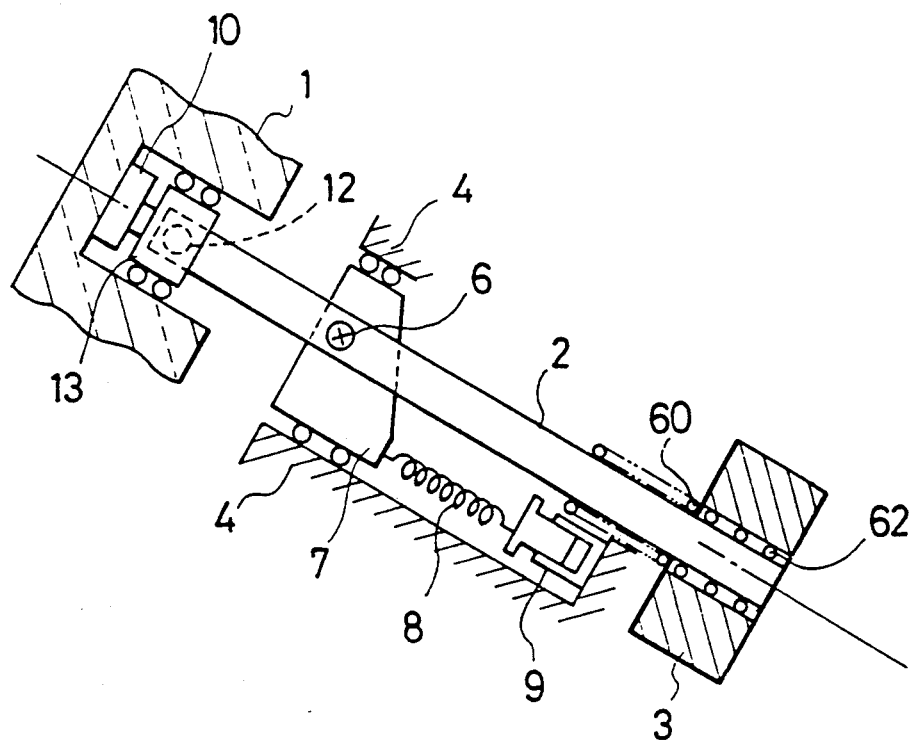
FIG. 14 is a schematic diagram illustrating the application of the spring-mounted counterweight in FIGS. 11 to 13 to the novel mirror support apparatus.

FIG. 14 shows how the coil spring 60 and slide bearing 62 demonstrated in FIGS. 11 to 13 can be applied to the first novel mirror support apparatus to substantially eliminate inaccuracy in the radial supporting force provided to the mirror 1. The mirror support apparatus in FIG. 14 is identical to that shown in FIG. 4 except for the addition of the coil spring 60 and slide bearing 62. The coil spring 60 and slide bearing 62 of FIG. 14 function exactly as in FIG. 11 to compensate for sag of the lever 2. A mirror support apparatus of the design in FIG. 14 can accordingly apply highly precise supporting forces in both the axial and radial directions.

Similar coil springs and slide bearings can be added to the mirror support apparatus shown in FIGS. 5 to 10. Alternatively, leaf springs like the leaf springs 64 in FIG. 12 can be added.

Figure 15:
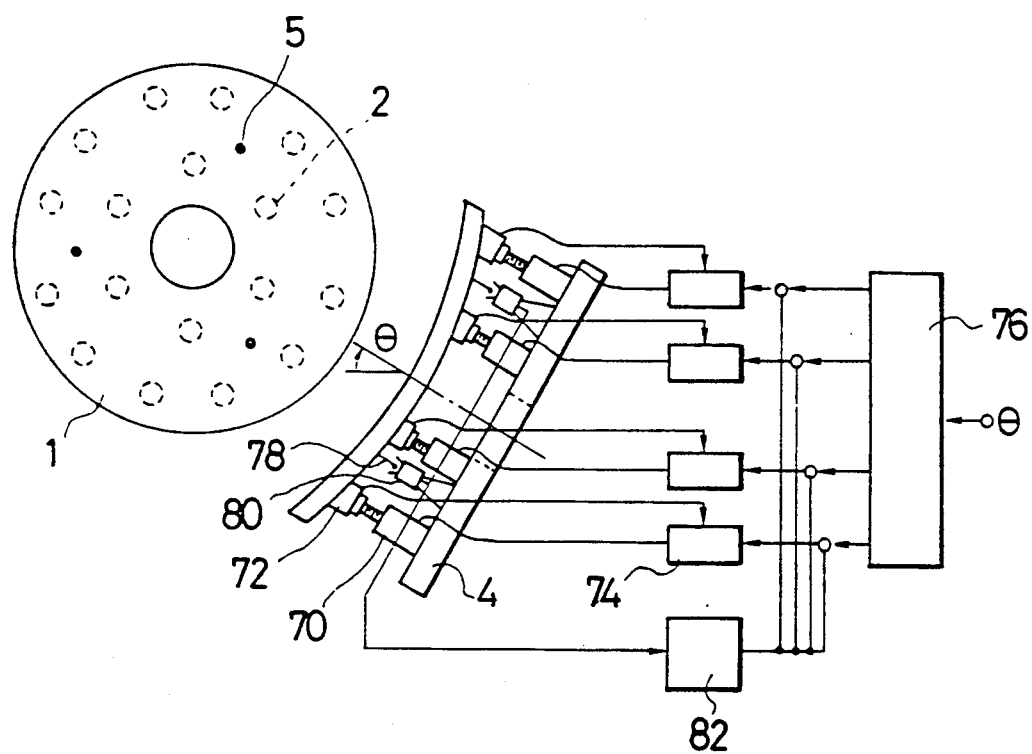
FIG. 15 is a schematic diagram of the overall configuration of a novel mirror support system.

Thus far, only the actual mirror support apparatus has been described. Next a mirror support system incorporating the novel mirror support apparatus will be described. A block diagram of the novel mirror support system is shown in FIG. 15. The mirror 1 is supported by a plurality of actuators 70 which are mounted on a mirror cell 4. Each of the actuators 70 is a mirror support apparatus of one of the types shown in FIGS. 4 to 10 and FIG. 14, or of a combination thereof. Each actuator 70 includes a load cell 72, this being either the load cell 10 in FIGS. 4, 9, 10, or 14 or the load cell 38 in FIGS. 5 to 8. The applied force is sensed by the load cell 72, the output signal from which is sent to a controller 74. Each actuator 70 has its own controller 74.

The primary mirror support apparatus also comprises a group controller 76. The group controller 76 receives an input signal indicating the current attitude $\theta$ of the telescope, and sends commands to the controllers 74 indicating the optimum axial force to be applied by each actuator 70. Each controller 74 controls its actuator 70 so that the axial supporting force provided by the actuator 70 equals the optimum force indicated by the command from the group controller 76.

The mirror 1 also has three fixed supports 78. Each fixed support 78 has its own load cell 80 to sense the axial load supported at that point. The values sensed by these load cells 80 are sent to a feedback device 82. The feedback device 82 adds information to the commands sent from the group controller 76 to the controllers 74.

The controllers 74, group controller 76, and feedback device 82 form a control system as mentioned in the description of FIG. 4.

This mirror support system operates as follows. As the telescope shifts in attitude to track the motions of stars, the group controller 76 constantly calculates the optimum axial force to be applied by the actuators 70 to counteract the weight of the mirror 1 and sends appropriate commands to their controllers 74. If the mirror 1 is subjected to an external force such as a wind load or inertial load, the effect of this force is detected by the load cells 80 attached to the fixed supports 78. The force data from these load cells 80 are sent to the feedback device 82, which calculates the additional axial force necessary to counteract the external force and adds information indicating this additional axial force to the commands to the controllers 74. The controllers 74 in turn adjust the axial force applied by the actuators 70 so that it is equal to the optimum axial force calculated by the group controller 76 plus the additional axial force required by the feedback device 82. In this way, deformation of the mirror surface due to both the mirror's own weight and external factors such as wind can be prevented.

One way in which the feedback device 82 can calculate the required additional force is to distribute the force over all of the actuators 70, thus treating the external force as a additional force load. In this method the distributed is expressed as the sum of three low-order forces: a force shown in FIG. 16A that is uniform with respect to both the x and y axes; a force shown in FIG. 16B that is uniform with respect to the y axis but varies linearly with respect to the y axis; and a force shown in FIG. 16C that is uniform with respect to the y axis but varies linearly with respect to the x axis: where the x and y axes are two mutually perpendicular axes of the mirror 1. The data from the three load cells 80 attached to the fixed supports 78 provide sufficient information for determining the magnitude of the load in FIG. 16A and the gradients of the loads in FIGS. 16B and 16C.

An alternative way in which the support feedback device 82 can calculate the required compensating force is to divide the mirror 1 into three sections and calculate the additional force to be applied by the actuators 70 in each section from the data provided by the load sensor 80 belonging to the fixed support 78 in that section as seen in FIG. 17. The division into sections preferably should be made so that a fixed support 78 is located near the center of each section.

In addition to compensating for external forces, the feedback device 82 can also compensate for forces arising from measurement error in load cells 72 of the actuators 70. A primary mirror support system as shown in FIG. 15, employing actuators as shown in FIGS. 4 to 10 or FIG. 14, is thus capable of reliably supporting a large, thin telescope mirror in such a way that it maintains a highly accurate surface figure regardless of the telescope attitude and despite external factors such as wind loading.

The scope of the present invention is not limited to the embodiments described with reference to the drawings, but includes many modifications that will be obvious to one skilled in the art. For example, various drive mechanisms other than stepping motors can be used in the actuators. Also, the group controller in FIG. 15 can receive as input not only the telescope attitude θ but also information from a wavefront sensor that directly measures the surface figure of the mirror 1 by sensing the reflected image of a reference star. Such measurements can be used, for example, to calibrate the control system as necessary at infrequent intervals.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mirror support apparatus for mounting a mirror of a reflecting telescope in a mirror cell to provide axial and radial support to the mirror comprising:
   a lever having a first end and a second end, said lever being oriented in a direction substantially parallel to the axis of said telescope;
   a counterweight fastened to the first end of said lever;
   a first sliding mechanism slidably mounted in said mirror cell;
   a first gimbal mounted in said first sliding mechanism and attached to an intermediate point of said lever, for enabling said lever to pivot at different angles with respect to said first sliding mechanism;
   a load cell directly and rigidly attached to said mirror for detecting axial force;
   means for coupling the second end of said lever to said mirror and said load cell so that said lever can exert an axial force on said load cell and a radial force on said mirror;
   a drive mechanism mounted in said mirror cell, for moving said first sliding mechanism in a direction substantially parallel to the axis of said telescope; and
   means for controlling said drive mechanism according to the force detected by said load cell.

2. The mirror support apparatus according to claim 1, wherein said load cell is mounted in a hole in said mirror, and said coupling means comprises:
   a second sliding mechanism for sliding against the sides of said hole and pressing against said load cell; and
   a second gimbal mounted in said second sliding mechanism and attached to the second end of said lever, for transmitting force from said lever to said second sliding mechanism while permitting said lever to pivot at different angles with respect to said second sliding mechanism.

3. A mirror support apparatus for mounting a mirror of a reflecting telescope in a mirror cell to provide axial and radial support to the mirror of a reflecting telescope comprising:
   a lever having a first end and a second end, said lever being oriented in a direction substantially parallel to the axis of said telescope;
   a counterweight fastened to the first end of said lever;
   a first sliding mechanism slidably mounted in said mirror cell;
   a first gimbal mounted in said first sliding mechanism and attached to an intermediate point of said lever, for enabling said lever to pivot at different angles with respect to said first sliding mechanism;
   a load cell for detecting axial force;
   means for coupling the second end of said lever to said mirror including a sleeve fastened in a hole in said mirror, a load cell mount rigidly attached to said sleeve outside said hole, for rigidly holding said load cell, a ring rotationally coupled to the second end of said lever, a bearing rotationally coupled to said ring, a linking rod for coupling said bearing to said load cell, and suspending means for coupling said bearing to said sleeve so that said bearing is free to move axially with respect to said sleeve, but is immovable radially with respect to said sleeve;
   a drive mechanism mounted in said mirror cell, for moving said first sliding mechanism in a direction substantially parallel to the axis of said telescope; and
   means for controlling said drive mechanism according to the force detected by said load cell.

4. The mirror support apparatus according to claim 3, wherein said suspending means comprises a pair of flexible links attached to said sleeve and said bearing, said flexible links being flexible in the axial direction but not the radial direction.

5. The mirror support apparatus according to claim 3, wherein said suspending means comprises a pair of diaphragms attached to the inner surface of said sleeve and to the outer surface of said bearing at the front and rear of said bearing.

6. The mirror support apparatus according to claim 1, wherein said drive mechanism is coupled to said first sliding mechanism by a first spring.

7. The mirror support apparatus according to claim 6, further comprising a damping device for damping vibratory motions of said first sliding mechanism.

8. The mirror support apparatus according to claim 7, wherein said damping device is inserted between said first spring and said first sliding mechanism.

9. The mirror support apparatus according to claim 8, wherein said damping device is a rubber pad.

10. The mirror support apparatus according to claim 7, wherein said damping device is coupled to said first sliding mechanism and to said mirror cell.

11. The mirror support apparatus according to claim 10, wherein said damping device is a hydraulic damper.

12. The mirror support apparatus according to claim 10, wherein said damping device is a pneumatic damper.

13. The mirror support apparatus according to claim 1, wherein said counterweight is fastened to said lever by a spring.

14. The mirror support apparatus according to claim 13, wherein said spring is a coil spring extending substantially parallel to said lever, and the apparatus further comprises a slide bearing for enabling said counterweight to slide along said lever.

15. The mirror support apparatus according to claim 13, wherein said spring comprises a pair of leaf springs extending substantially perpendicular to said lever.

16. A mirror support system for supporting a mirror of a reflecting telescope, comprising:
a mirror cell;
a plurality of actuators mounted in said mirror cell for providing axial and radial support to said mirror, having load cells for sensing axial force;
at least one fixed support for providing rigid axial support to said mirror;
at least one fixed load cell for sensing axial force in said fixed support;
a group controller for receiving a signal indicating attitude of said reflecting telescope and therefrom generating commands indicating an optimum axial force;
a feedback device for receiving a load signal from said fixed load cell, calculating an additional axial force to be provided by said actuators, and adding information indicating said additional axial force to the commands generated by said group controller; and
a plurality of controllers for receiving signals from the load cells of respective actuators, receiving said commands from said group controller, and controlling respective actuators so as to bring said axial support into equality with said optimum axial force.

17. The mirror support system according to claim 16, wherein said fixed supports are provided at three points.

18. The mirror support system according to claim 17, wherein said feedback device calculates said additional axial force as a sum of:

an axial force applied uniformly by all said actuators;
an axial force that varies linearly with respect to a first axis of said mirror; and
an axial force that varies linearly with respect to a second axis of said mirror, said second axis being substantially perpendicular to the first axis.

19. The mirror support system according to claim 17, wherein said feedback device calculates said additional axial force by breaking said additional axial force down into three parts to be applied to three sections of said mirror.

20. The mirror support system according to claim 16, wherein respective actuators comprise:
a lever having a first end and a second end, said lever being oriented in a direction substantially parallel to the axis of said telescope;
a counterweight fastened to the first end of said lever;
a first sliding mechanism slidably mounted in said mirror cell;
a first gimbal mounted in said first sliding mechanism and attached to an intermediate point of said lever, for enabling said lever to pivot at different angles with respect to said first sliding mechanism;
a load cell rigidly attached to said mirror;
means for coupling the second end of said lever to said mirror and said load cell so that said lever can exert an axial force on said load cell and a radial force on said mirror; and
a drive mechanism mounted in said mirror cell, for moving said first sliding mechanism in a direction substantially parallel to the axis of said telescope.

* * * * *